United States Patent [19]

Liptay-Wagner et al.

[11] Patent Number: 4,686,374
[45] Date of Patent: Aug. 11, 1987

[54] SURFACE REFLECTIVITY DETECTOR WITH OIL MIST REFLECTIVITY ENHANCEMENT

[75] Inventors: Nicholas Liptay-Wagner; Roland Renaud, both of Windsor; Timothy R. Pryor, Tecumseh; Donald A. Clarke, Windsor, all of Canada

[73] Assignee: Diffracto Ltd., Windsor, Canada

[21] Appl. No.: 788,118

[22] Filed: Oct. 16, 1985

Related U.S. Application Data

[62] Division of Ser. No. 470,262, Feb. 25, 1983, Pat. No. 4,585,947, which is a division of Ser. No. 163,290, Jun. 26, 1980, Pat. No. 4,394,683.

[51] Int. Cl.[4] .......................................... G01N 21/86
[52] U.S. Cl. ................................. 250/571; 356/36
[58] Field of Search .................... 356/1, 376, 445–448, 356/36; 250/560, 561, 571, 572

[56] References Cited

U.S. PATENT DOCUMENTS 4,335,962 6/1982 DiMatteo et al. .................. 356/376
4,508,452 4/1985 DiMatteo et al. .................. 356/376

Primary Examiner—David C. Nelms
Attorney, Agent, or Firm—Larson and Taylor

[57] ABSTRACT

A method an apparatus are provided for inspecting the surface of objects such as panels for automobile vehicles wherein the surface of the object is sprayed with an oil mist or the like to increase the reflectivity thereof. The surface is then illuminated with light so that the light image reflected therefrom is formed on a light detector such as a photodiode array. The output of the light detector is analyzed to determine surface features of the object such as "dings" and dents therein.

28 Claims, 30 Drawing Figures

FIG. 6a
FIG. 6b
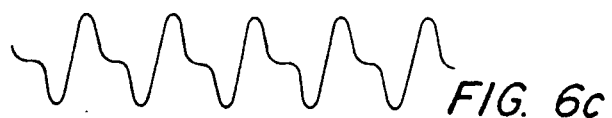
FIG. 6c
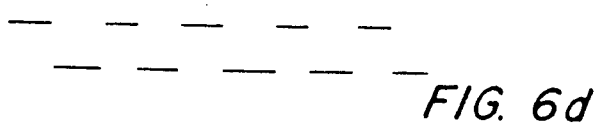
FIG. 6d
FIG. 7a — RAW VIDEO (TP0)
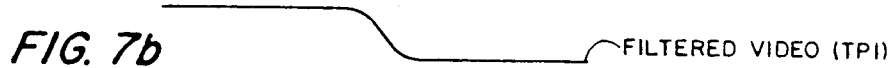
FIG. 7b — FILTERED VIDEO (TP1)
FIG. 7c — 1st DIFFERENTIATOR O/P (TP2)
FIG. 7d — 2nd DIFFERENTIATOR O/P (TP3)
FIG. 8a
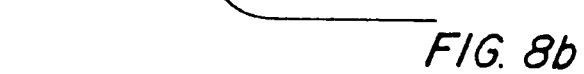
FIG. 8b
FIG. 8c
FIG. 8d

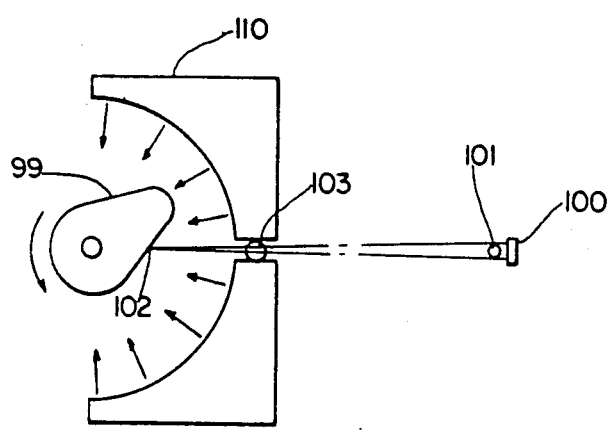
FIG. 9
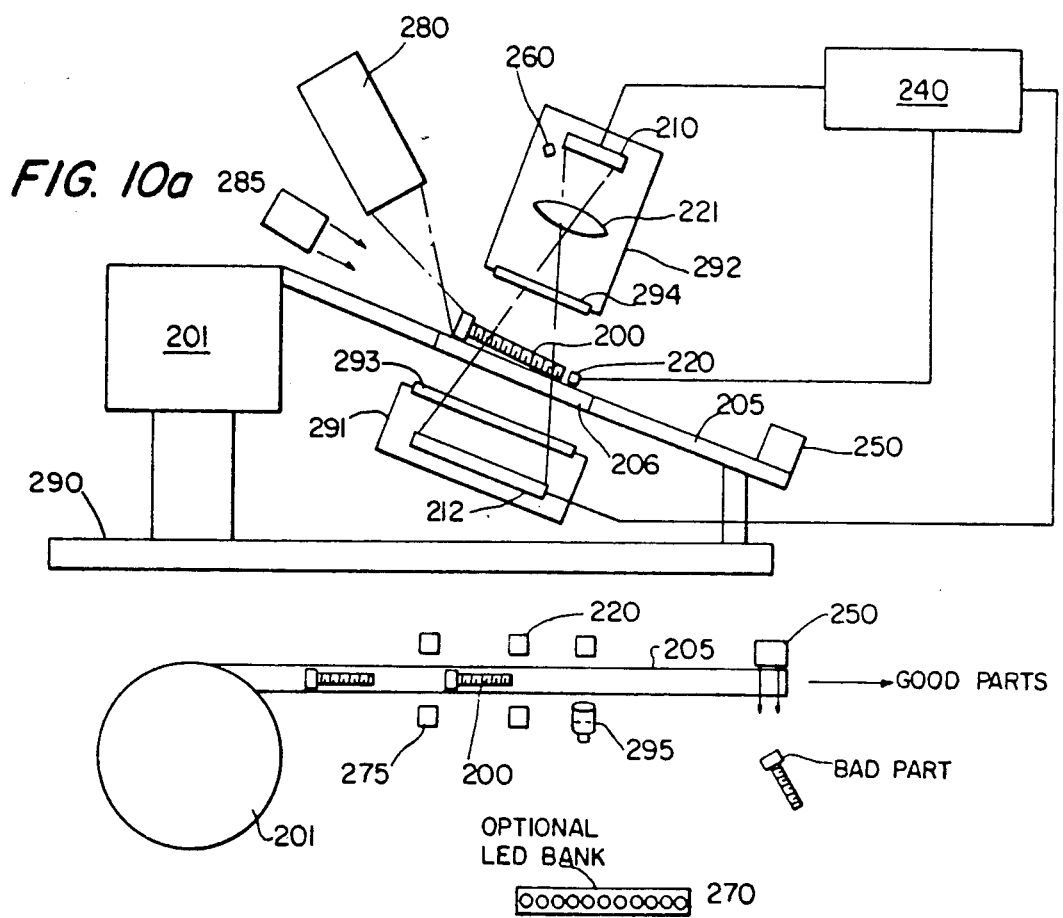
FIG. 10a
FIG. 10b

SURFACE REFLECTIVITY DETECTOR WITH OIL MIST REFLECTIVITY ENHANCEMENT

This is a division of application Ser. No. 470,262, filed Feb. 25, 1983, now U.S. Pat. No. 4,585,947, which is a divisional of application Ser. No. 163,290, filed June 26, 1980, now U.S. Pat. No. 4,394,683.

This invention relates to new and useful electro-optical methods and apparatus using photodetector arrays for measurement of parts and other objects in industrial environments. Several particularly useful optical embodiments are illustrated together with desirable electronic circuitry for improving the accuracy of practical systems of this type.

All embodiment disclosed utilize detection of one or more points in light patterns to effect the measurement. Such patterns can be formed using ultra-violet, visible and infra red light, and typically include profile edge images of parts, reflective images of part surfaces, diffraction patterns produced by one or more edges of a part and images of spots projected onto a part.

The electronic technique disclosed is primarily aimed at improving resolution beyond the limited number of array elements available, negating effects of inter element sensitivity differences and compensating for light power variations both in time and spatially across the array. All of these factors are important in obtaining accurate performance of such systems in the industrial and other non-laboratory environments. "Real time" operation is provided, allowing high part rates or large numbers of measurements to be taken.

BRIEF DESCRIPTION OF THE DRAWINGS

In the accompanying drawings:

FIGS. 6a, 6b, 6c and 6d illustrate waveforms obtained in the process of diffraction fringe measurement;

FIGS. 7a, 7b, 7c and 7d illustrate waveforms obtained by a light to dark transition of an optical edge;

FIGS. 8a, 8b, 8c and 8d illustrate a defocussed optical edge of FIGS. 7a–7d;

FIG. 9 is a third embodiment of the invention for surface defect measurement;

FIGS. 10a and 10b illustrate a fourth embodiment of the invention for sorting parts;

FIG. 1 illustrates a typical measurement according to the invention. An object, in this case a cutter insert, 1 is illuminated by light field, 2, of light source 3. The image 4 (inverted) of the cutter edge is formed by lens 5 onto matrix photo diode array 6. Each vertical row of said matrix is analyzed by circuit 8 to obtain either a digital display 10 of cutter dimension in any section, an accept/reject comparison with light output 11 or a visual display 12 of the cutter edge or outline thereof on a TV screen. Generally windows 14 and 15 in housings 16 and 17 are also present to protect the optical elements.

Figure 1:
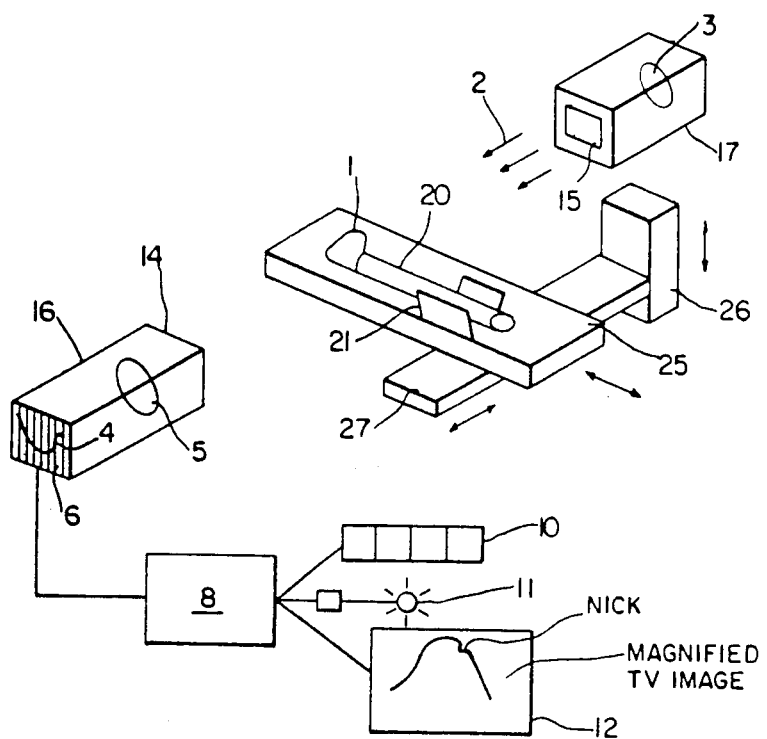
FIG. 1 illustrates a typical measurement according to the invention.

Other aspects and advantages of this embodiment will be subsequently discussed and it is noted that copending applications by one or more of the inventors contains many other similar optical configurations where the following electronic aspects may be of use. These electronic aspects are very important as the accuracy of a system such as FIG. 1 is totally dependent on the ability of the analyzing circuitry to ascertain where in space the image is on the diode array, in the presence of diode array sensitivity differences, dirt on the windows, 14 and 15, and non uniformity of the light field 2 across the object edge.

The electronic processing now described applies equally to linear photo detector arrays, and circular arrays as well as matrix arrays such as 6, on a one axis line by line basis. Other techniques for two axis image edge detection and enhancement will also be disclosed.

At the present state of the art in building photo detector arrays physical limitations are encountered in producing small array elements which in turn therefore limited the use of arrays to coarser measurements and inhibited working in field applications. The array size limitation imposes a limit on the spatial resolution achievable in practice, which falls far short of the theoretical limits of the optical imaging elements.

Furthermore, in these devices element to element sensitivity variations are unavoidable due to the very complex nature of the array manufacturing process. This factor coupled with variations in the light field lead to gross errors in photo detector array based optical measurement systems.

The disclosed invention overcomes all of these limitations and makes high accuracy measurements possible in areas heretofore closed to automated optical gaging systems.

By their nature, discrete element photo detector arrays will only provide discrete spatial samples of the light field. The theoretically obtainable spatial resolution in detector array systems is limited to the physical dimensions of one individual array element, when simple thresholding techniques are used on the array output signal. In practice, these theoretical limits can only be approached, but never reached.

To overcome the limitation of the finite element size of detector arrays one has to consider the following. When an array is sampled sequentially at a precise frequency the video signal produced will be a time domain representation of the optical signal in space. Once the signal is in the time domain one can process the signal by analog electronic frequency domain circuits. Low-pass filters and differentiators provide the necessary frequency domain signal processing capability.

Figure 2:
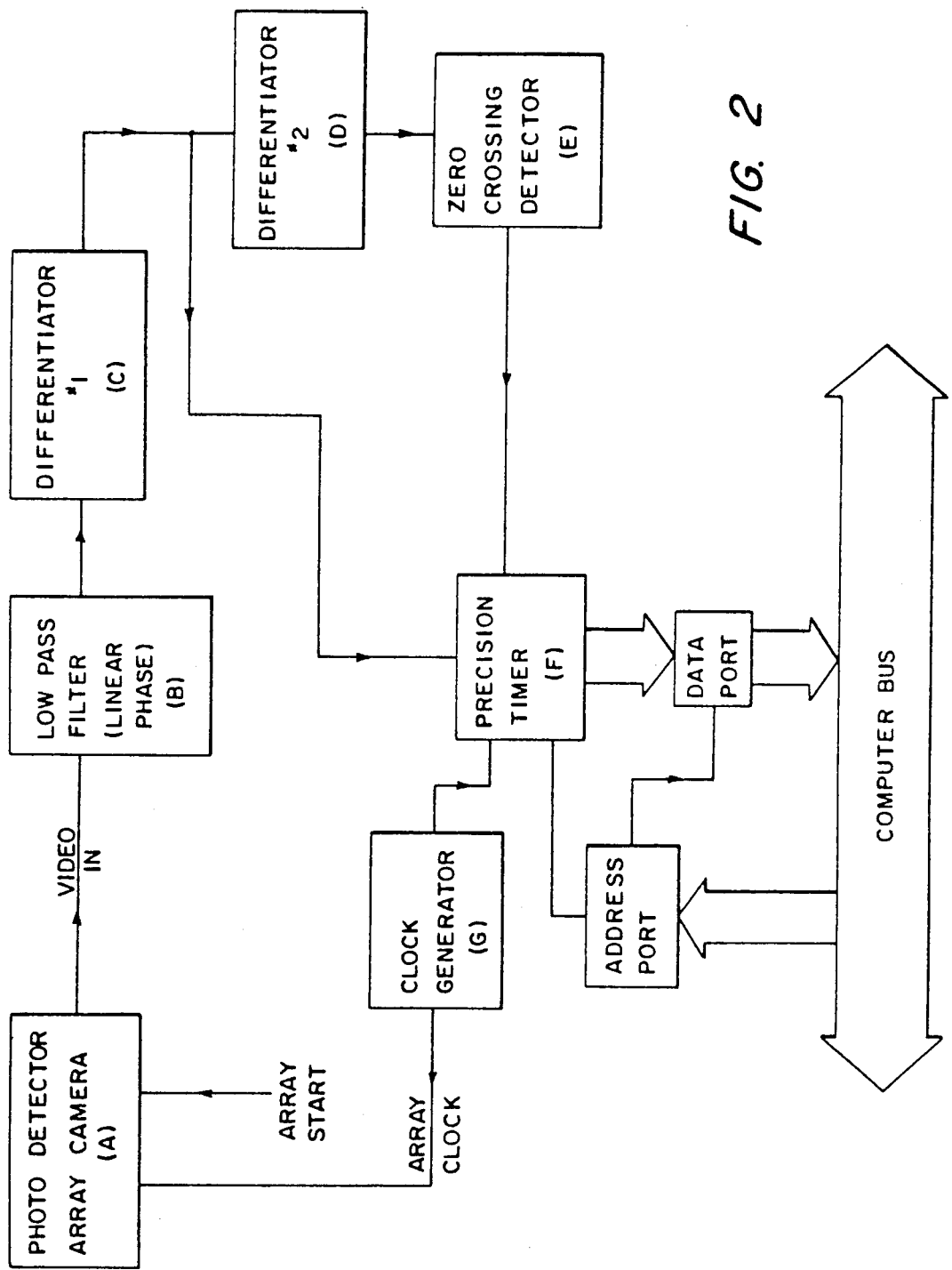
FIG. 2 is a block diagram of one embodiment of the invention.

A block diagram embodiment is shown in FIG. 2. The video signal coming from photo detector array (a) is low-pass filtered by a linear phase filter (b) such as a Bessel filter, then differentiated twice by (c) and (d) following the signal is zero crossing detected (e). The time interval between the start of the array and a zero crossing of the differentiated signal, or the time interval between the first and subsequent zero crossings is measured by a precision timer (f). The time base signal for the timer and the clock pulses for the sampling of the diode array is produced by a highly stable clock generator (g). Typically the location of the image edge is then fed to a microcomputer as shown for comparison with stored values of master parts or the like.

The importance of using this precision timer to obtain spatial resolution enchancement is shown in FIG. 3.

Figure 3A:
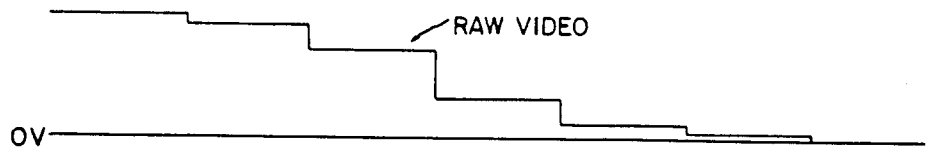
FIGS. 3a, 3b, 3c, 3d, 3e and 3f show various waveforms obtained by the invention.

FIG. 3a indicates a magnified view of a transition from light to dark as would be observed at the edge of a part. The horizontal axis indicates time (which is proportional to position on a photodetector array) and the vertical axis indicates a voltage which is proportional to the intensity of the light falling on the array. The edge of the object is defined by the point of inflection of the signal.

The precise location of the image edge cannot be readily seen because of the finite size of the array elements.

Figure 3B:
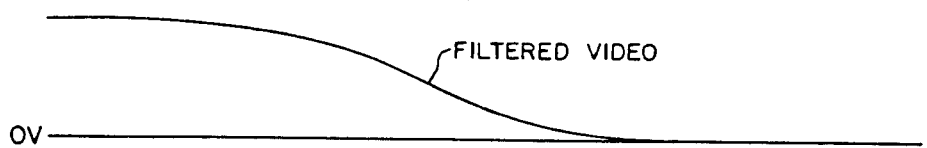

Passing this signal through a low pass filter provides an interpolated signal that reduced the effect of the sampling frequency (FIG. 3b).

Figure 3C:
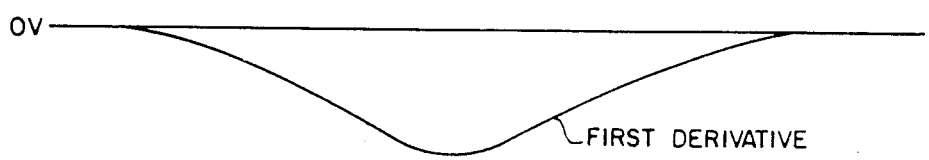
Figure 3D:
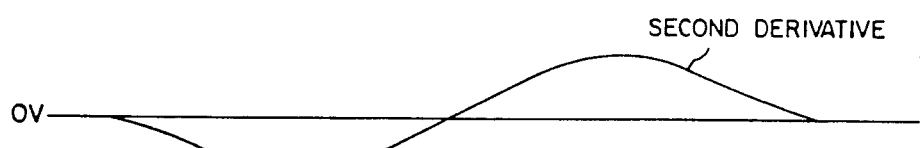

FIGS. 3c and 3d show the signal after being differentiated twice. The point of inflection that represents the edge of the image is now indicated by the position that the second derivative crosses zero. The zero crossing detector shown as E in FIG. 2 will detect the position of the image edge.

It is in the process of communicating this edge position to the computer that the timer precision of F (in FIG. 2) becomes important. Since the goal is to determine the position of this image edge, a counter or clock timer must be used to keep track of which element of the photodetector array the zero crossing refers to.

When the zero crossing detector indicates that the edge of the image has been found, the value of this clock is stored by the timer (F). If this clock is not pulsing very often, the image edge will be found but the position won't be stored until later (which means further away).

Figure 3E:
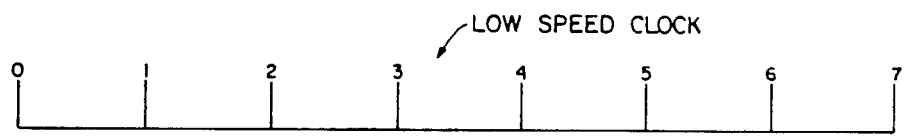
Figure 3F:
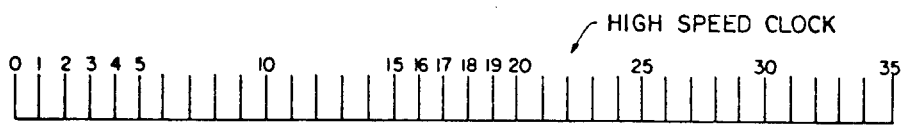

Consider FIG. 3e. The period of this clock is the same as the element to element period of the array. In this case the image edge will be found to be on clock pulse 3 or 4 depending on the exact position of the edge. This corresponds to a spatial resolution of only 1 part in 7. (Detector arrays with many more elements are available but this 7 element array is sufficient to illustrate the technique.)

If a higher frequency clock is used (FIG. 3f), the occurance of a zero crossing is checked for more often. Therefore there is less delay between the time a zero crossing occurs and the time its existance is detected. In this example the clock timer is 5 times the frequency of the element rate of the array. Now the image edge will be found to occur at clock pulse 16 or 17. This corresponds to a spatial resolution of 1 part in 35 using the data from the same photodetector array. Another way of looking at it is that each array element has been broken into 5 parts, giving results similar to those of an array with 5 times as many elements.

It is important to note that the high speed clock does not have to be an even multiple of the array clock (although it is sometimes convenient). It is only necessary that the high speed clock be synchronized with the beginning of the video scan to provide repeatable results.

This technique has been shown to locate the edges of an image 64 times more accurately than would be possible using a low speed clock.

The use of a well designed low pass filter is crucial to the operation of the embodiments shown. The filter has two specific purposes in the electronic lineup. One is to remove the sampling frequency components from the video signal, the other is to provide an instantaneous weighted average of several array elements. By producing this instantaneous weighted average, the array element to element sensitivity variations (typically 5-10%) can be overcome, thereby improving the consistency of the readings. This also provides a necessary interpolation between elements.

The elimination of the sampling clock noise from the signal is required because the differentiator following the filter would respond to the clock frequency components present in the video signal.

Depending on the optical signal being processed and the particular aspect of the signal being sought, one uses single or double differentiation before zero detection to arrive at the signals to be timed by the precision timer.

Double differentiation is used when the inflection points are sought in optical signals, such as the light-/dark edge transition of an image, or multiple edge transitions found in images of bar codes, or images of surface flaws. Also diffraction fringes and triangulation spots can also be analyzed by determining inflection points as well.

The very high resolution timer FIG. 2 (G) utilized in the system allows the detection of the precise location of the features sought in the optical signals to great accuracies. Tests have shown, that detector array element spacings can effectively be subdivided into 64 parts with 1 count error. This very high resolution allows the construction of optical instruments with accuracies formerly unattainable.

The system as described here also provides optical power compensation by its nature. Variations in light intensity have no effect on the locations of image edge points detected. Typically the dynamic range is 8 to 1 in intensity when the array element resolution is enhanced by a factor of 8. This tolerance to light level variations makes the measuring instrument quite insensitive to light field variations due to changes in reflectivity, aging of light sources, settling of dust on the imaging lenses etc.

The double differentiation technique operates on finding the exact location of the inflection point in the light/dark transition of imaged edges of solids. This inflection point does not change its location as the light field is varied and double differentiation coupled with zero crossing provides a system which is quite insensitive to optical power changes. The added benefit of this system is the insensitivity to defocussing. A considerable amount of image degradation has to take place before the capability to detect an edge of image is lost.

Note that the concepts above apply equally to reflective (front surface) illumination, and are useful for detection of surface defects as in co-pending application, Ser. No. 15,792, now U.S. Pat. No. 4,305,661.

The analysis concepts described here are useful also in determination of diffraction pattern fringe locations, either using the first or second derivitive of the array signal.

Figure 4:
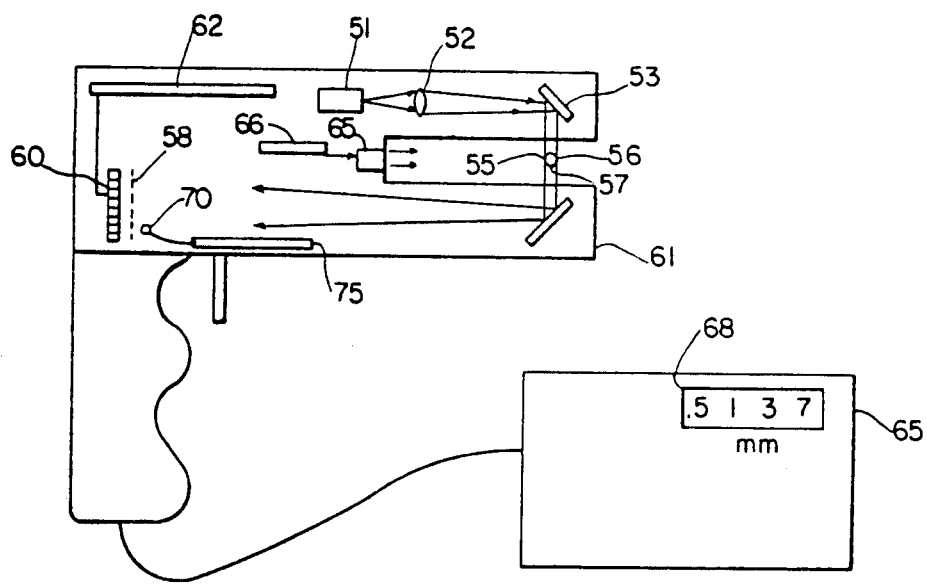
FIG. 4 is a second embodiment of the invention.

A variation on the disclosed electronics is also useful in real time processing of diffraction patterns used in industrial measurement systems an example of which is described as follows. Consider FIG. 4 which illustrates measurement of wire diameter with a hand held "gun", 50, according to the invention.

As shown, diode laser 51 illuminates via lens 52 and mirror 53 the edges 55 and 56 of fine wire 57, typically coated magnet wire 1 mm or less in diameter. The resulting diffraction pattern 58, resulting from interference of diffraction waves emanating from said edges is detected and scanned by photodetector array 60. In this case a type Reticon 512C photodiode array. Mirror 61 is used to deflect the light in order to make a compact housing.

Figure 5:
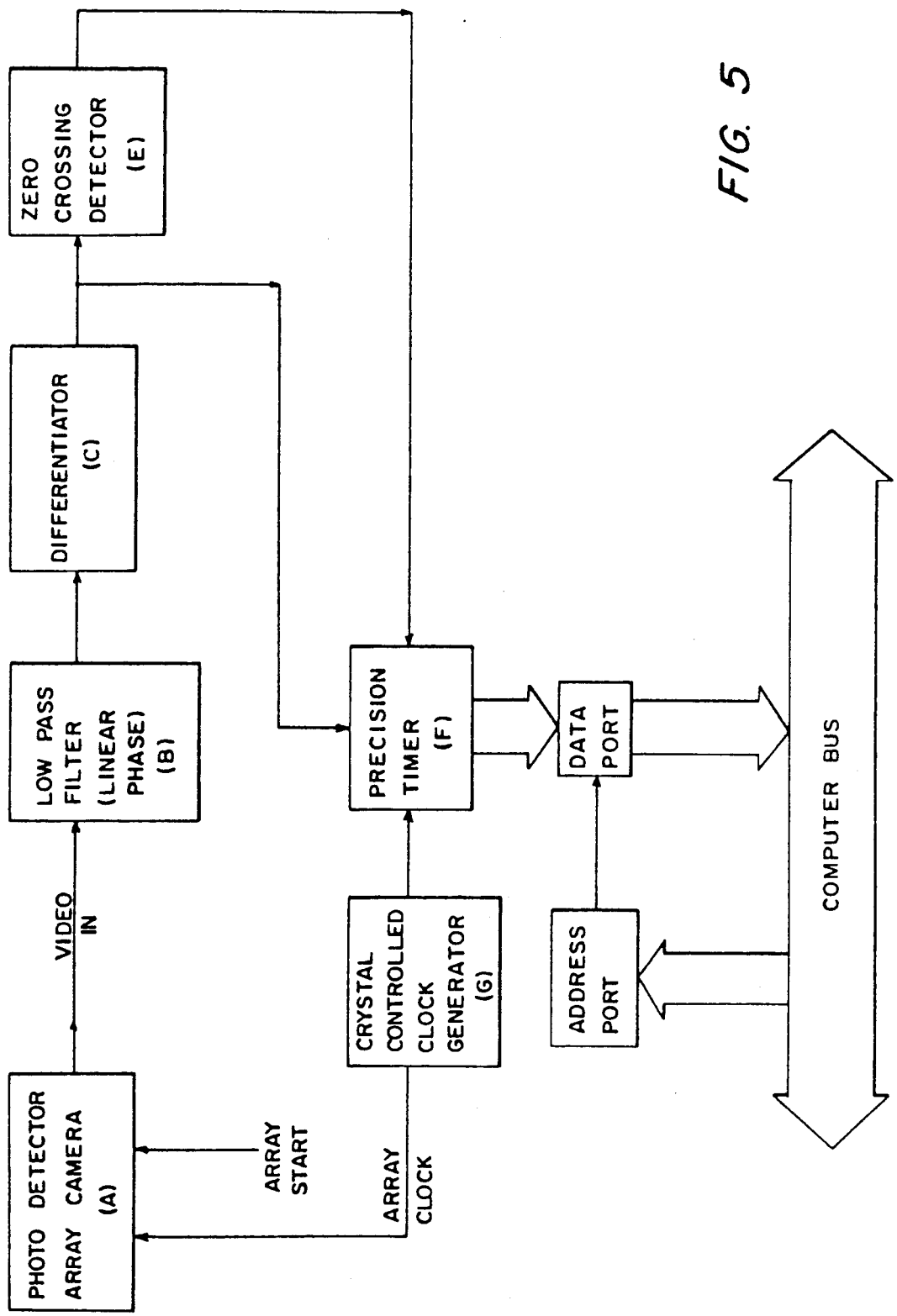
FIG. 5 is a block diagram of the embodiment of FIG. 4.

This circuit on board 62, whose block diagram is shown in FIG. 5, has been designed to process diffraction fringes falling on the diode array. The output of the circuit is a set of two binary numbers, one is the number of fringes detected the other is the distance measured between the first and the last detectable fringe. The average fringe frequency is arrived at when the number of fringe spaces is divided by the distance as measured by the diode array. From this and two other constants the wire diameter can be calculated.

The basic diffraction equation is:

$$W = \frac{nR\lambda}{Xn} \text{ or } W = R\lambda B \text{ or } B = \frac{n}{Xn}$$

where $W$ = slit width $n$ = fringe number $R$ = distance between slit and detector $\lambda$ = wavelength of light (HeNe laser $\lambda$ = 6.328 nm)

$B$ = fringe frequency where $$B = \frac{\text{no. of fringes detected}}{\text{distance value}}$$

The intensity profile is $I \approx A \sin^2 a/a^2$.

This equation gives a cyclic intensity variation, where I=0 when a=$\overline{\chi}$, 2$\overline{\chi}$, n$\overline{\chi}$. In other words, the minima (or fringes) are located at regular intervals. The spacing can be measured by simply locating the position of the first and last fringes on the diode array, taking the distance between them and counting the fringe spaces in that distance.

There is another implication in the above equation namely by a simple differentiation of the video signal and zero crossing detection the minima can be located accurately and quickly.

The spatial resolution of the diode array is enchanced by the use of an averaging L.P. video filter and a precision timing clock that operates 4, 8 or 16 times faster than the diode array clock. When a minimum point is found its position can be determined 4, 8 or 16 times more precisely than by the conventional clocking method.

The description of a diffraction system is beyond the scope of this discussion, however, some of the advantages of diffraction are given here:

(a) There is no theoretical limit of resolution in a diffracting system (1μin. resolution has been achieved).

(b) No lens needs to be used, so a variable element is eliminated from the optical train.

(c) Magnification varies with the R distance, because of this a diffraction system is less sensitive to axial position variations than an imaging system.

This circuit described in this invention has been designed to operate with a boxcar type video signal generated by a Reticon RC 100B board or equivalent.

The standard pin edge connector of this board sits on the Diffracto CPU bus and is memory mapped. On the opposite end of the board there is a connector to provide junction to a round cable coming from the RC 100B board in the optical head. This connector carries the video blanking, array clock and array start signals along with a flash trigger signal and 4 ground pins. The intention is to have only signals and ground lines in the cable and to have the supply voltages independently connected in the optical head.

The boxcar video signal is filtered to remove the clock frequency and any odd/even pattern noise in the signal. The filter utilized is a 6 pole Bessell low pass filter with its cut off frequency set at 1/10 of the array clock frequency. Operating this way the filter keeps the clock frequency more than 100 dB below the signal level. The advantage of using a Bessell filter is that it does not "ring" or produce unwanted harmonics. It also acts as an averager for several diode array elements at any one time, following a weighted window function. This feature, coupled with a system clock operating at a frequency several times the diode array clock frequency will allow the resolution to exceed that of the element resolution level inherent in any diode array.

The diffraction pattern minima are found by differentiating and detecting the zero crossings in the filtered video signal.

At the first minimum in the diffraction pattern a fast counter is started. The ratio of the counter clock frequency to the array clock frequency is referred to as the electronic magnification factor (EMF).

After the first fringe minimum, succeeding minima are used to latch the instantaneous count into two output ports. After the last fringe minimum encountered on the array, the number remaining in the latches is the counts between the first and last fringe.

A separate counter is used to count the number of fringe spaces encountered on the array scan. The total number of counts and the number of fringe spacing can then be accessed by the resident computer system.

When the diode array is in saturation, the digital latching hardware is disabled to prevent latching the count on false fringes. Due to the fringe envelope, the outer fringes on the array may be too small to give a reliable reading. A small fringe detector circuit disables the latching hardware when the fringe maxima fall below a set threshold.

A monostable is used to delay gaging on the scan start allowing for filter settling time.

As soon as a DATA REQUEST occurs, a start pulse is sent to the array for the DUMP cycle. At the end of the dump cycle a flash monostable is triggered. This monostable output is available on the connector for flash triggering (pulsed lasers). After the flash window, another start pulse is sent out to the array for the READ cycle. Gaging takes place during this array scan.

The data from circuit 62 is sent to a microcomputer 65 (typically an Intel 8085) and processed to display wire diameter in inches, microns, etc. and display 68. Accuracy is in the area of 1-5 millionths of an inch (depending on the number of array elements utilized) and is superior to all other known wire gages.

The system described is also extremely linear, with less than 10 millionths error over a whole range of diameters 0.0005 to 0.020". In addition the same electronic approach can be used on diffraction patterns resulting from two edges or a cylindrical part and an edge, as typified by U.S. Pat. No. 3,994,584 by one of the inventors.

When diode laser 51 is operated continuously or a gas laser is used, readings at rates up to 1000/second can be obtained. This is generally fast enough to freeze the wire position with no pattern blurr. However, this can absolutely be accomplished by using lens 52 to focus undiffracted radiation at the plane of the array, thereby creating a quasi static pattern, and by utilizing a pulsed diode laser 51 to freeze the pattern with a short stroboscopic pulse. This pulse can also be triggered by a separate detector 65, and circuit 66, used to indicate that the wire is in position to be measured—a particularly desirable feature in a hand-held unit.

Naturally the unit does not have to be hand held and can be fixed in place and included in a control system to feed back data to control a wire coating machine for example.

Analog detector 70 positioned on one of the ramps of a fringe in the diffraction pattern and comparison circuit 75 incorporating a high pass filter can also be used to detect "bumps" in magnet wire coatings. Such bumps are typically 20% or greater diameter change and cause a violent but momentary shift in the diffraction fringe location which is immediately detected by circuit 75. One bump can be detected or a count of bumps per meter can be obtained via the microcomputer.

The stages of the processing of the electronic signals achieved by this invention is demonstrated in FIGS. 6, 7 and 8 for a number of different applications. FIG. 6 illustrates the process for a diffraction fringe application, FIG. 7 for a light to dark transition of an optical edge and FIG. 8 for the same optical edge that has been defocussed.

FIG. 6 top trace shows the video output signal of a photo detector array, the optical signal generating it is a single slit diffraction pattern. The spatially sampled nature of the signal is clearly visible in the dot pattern (trace a) that makes up this signal. The centers of the fringe maxima are saturated. Without further processing any resolution of space would be limited to 1 element represented by each of the dots.

Trace (b) is a low-pass filtered version of the first signal. The continuous nature of the optical signal at this point is clearly restored and there are definitely no discontinuities in the signal, phase relationship in the signal. The apparent shift to the right of the signals b, c and d is caused by the delay in the low pass filter and the differentiators. The Bessel filter is chosen because it exhibits a constant time delay which is not dependent on the video signal. Since this time delay is constant it can be easily recounted for in the system calibration. The continuous nature of the optical signal at this point is clearly restored and there are definitely no discontinuities in the signal.

Trace (c) is the filtered video signal after differentiation. The negative to positive going zero crossings in the differentiated signal coincide with the filtered signal minima. Trace (d) shows the output of the zero crossing detector, the negative going edges accurately locate the relative positions of the diffraction pattern minima.

FIG. 7 shows array signal output traces, indicative of light/dark transition of a greatly magnified edge of an object projected onto an array using a lens. Again, as clearly seen in trace (a), spatial sampling of the array destroys spatial continuity, which is restored by the constant time delay low-pass filter as seen in trace (b). The filter also provides interpolation between sampled points in space. Trace (c) is the first differential and trace (d) is the second differential of trace (b). The inflection point in the light to dark transition is fixed in space and can be found very precisely using the double differentiation method. Zero crossing occurs in the second differential at the inflection point and this point does not shift with changes in light intensity, therefore, it provides an automatic means of optical power compensation.

FIG. 7 shows a focussed image traces whereas FIG. 8 shows equivalent traces for an image somewhat out of focus. As seen from the signals zero crossing detection will importantly still give the location of the edge in question although magnification changes can be experienced.

In the embodiment of FIG. 1 the disclosed circuit plus the solid state digital array are crucial to providing a workable high resolution device capable of fulfilling modern industrial requirements. For example it is commonly required to set cutters to accuracies of 0.0001" or better which can readily be inspected in the apparatus of FIG. 1.

A typical detector for the cutter application could be a General Electric (GE) TN2200 128×128 element diode array with elements on 1.2×1.2 mil centers, and a lens magnification of 2:1, in this case the image of the critical edge of the cutter tip will lie on the array however, with a resolution of 0.0006" per element which is insufficient to serve most applications. With the application of the disclosed invention to find the edge image, the image resolution easily becomes 20 millionths of an inch! No drift or non linearity occurs due to the digital diode array position.

In the FIG. 1 example the cutter insert 1 is locked in boring bar 20, resting in Vee block setup fixture 21. It is now of interest to consider tying in of optical x, y and z axes provided by slides 25, 26 and 27 each with its own position encoder (not shown for clarity). Provision of such axes is similar to many optical coordinate projectors which may well be displaced by device here disclosed.

From the readings obtained, one can project the cutter contour and location greatly magnified in the scan axis onto a video display. This is generally an analog CRT which has its own error unless it too is a digital array device such as a LCD flat display not yet widely available.

More appropos but more expensive is to automatically compare the cutter edge data to limits. For example, the cutter point can be immediately found by comparing successive scans, as can cutter angle. Since resolution is very high, cutter defects such as chipped out areas can also be detected as well.

Figure 11:
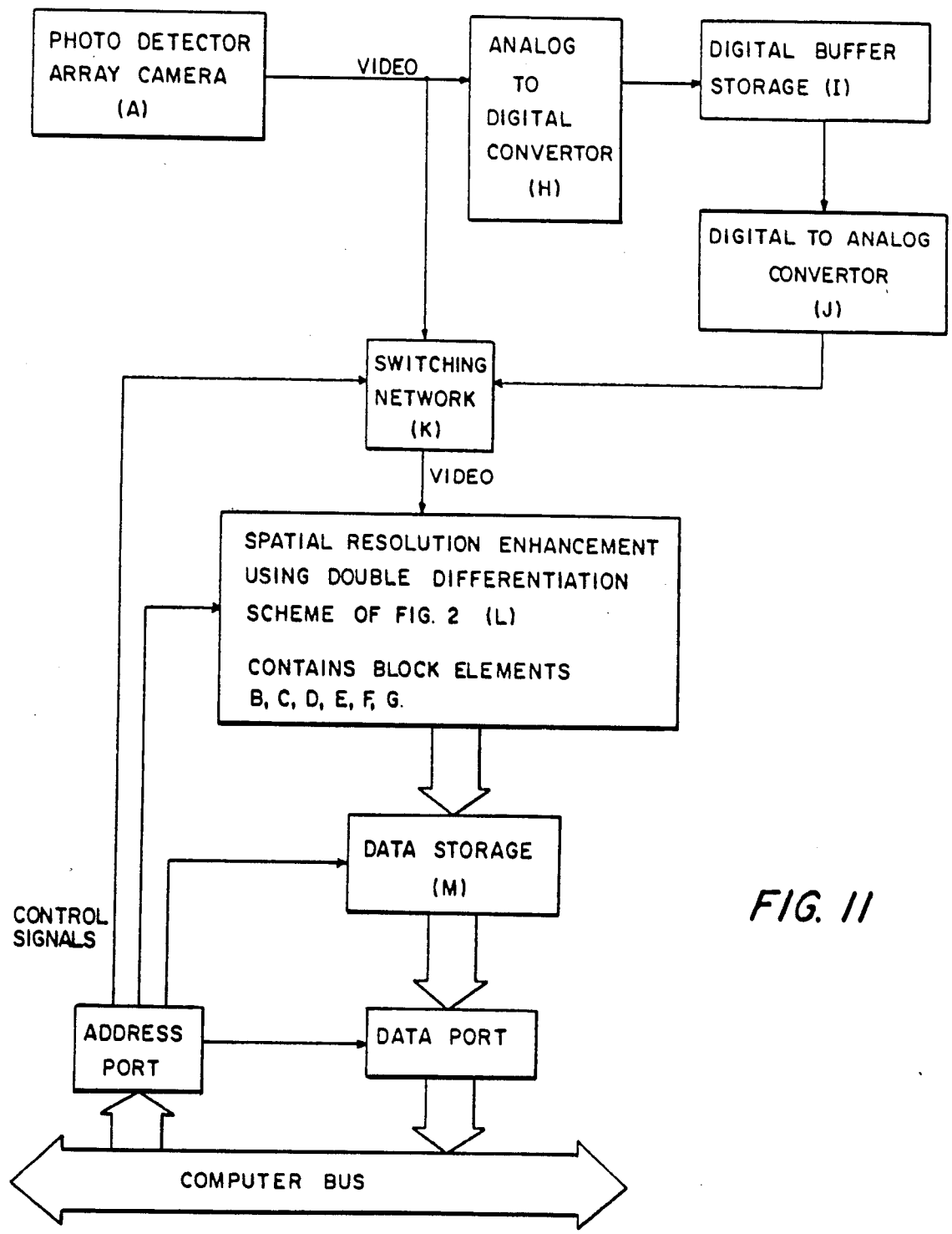
FIG. 11 shows a two dimensional inspection apparatus in block diagram form.

The considerable resolution enhancement provided allows measurement to high resolution (e.g. 0.0001") over a large field of view. For example, over a 1" field a commonly available GE TN 2500 250×250 element array with the disclosed electronic technique easily provides sufficient resolution in the scan axis and via computer augmented processing in the other axis as well (see FIG. 11).

Lens errors over the field can be corrected in the microcomputer if desired which avoids the cost of very expensive flat field distortion free lenses. This can be done by storing points in a precision xy grating placed at the object position and interpolating test data obtained between these stored known points. This also takes out residual light field errors although the disclosed circuitry can account for almost all such errors.

The above resolution of 0.0001" over a 1" object field is far better than obtainable with even the largest optical projectors and accuracy is "locked-in" due to the driftless and digital solid state array. Range however can be vastly increased in an automatic manner by tying the readings obtained in to the slide readouts shown.

FIG. 9 illustrates the use of the circuitry to see pits, scores and other defects on automotive camshaft lobes e.g. 99. The basic defect analysis processing differ from that disclosed in copending application Ser. No. 15,792, in that here the defect edges are detected by the double differential circuit and their width determined between inflection points or by the number of successive scan lines on which a flaw is detected. However, the optical apparatus here described may also be used with other circuitry such as that of the referenced application.

A linear diode array 100 such as a Reticon 256C on which the image 101 of the cam lobe axial strip 102 viewed by the array is formed by lens 103 typically of large number for good depth of field. In practice this is accomplished using a 1 mm diameter objective lens to limit the angular aperture. Light source 110 comprised of continuous arc light or numerous illumination individual sources arranged in an arc illuminates the cam lobe from multiple angles such that sufficient light can reach the array during all positions of cam angular rotation.

With such arrangement relatively little variation in light power returned from the surface exists and this can be accounted for by the processing circuitry as described. Typically 100 scans/sec. or greater of the diode array may be achieved.

Note that this flaw detection technique can also be used on other curving and focal depth varying objects. Of particular interest are ball bearings, raceways, and cavities such as molds etc.

FIG. 10 illustrates another embodiment of the invention used for sorting fasteners and other parts of all sorts. The particular embodiment is set up for cylindrical type parts such as bolts, dowels, rivets, etc. A bolt 200 fed by feeder 201 slides down Vee track 205 having translucent section 206. A matrix photodiode array 210 is positioned above the track, with a Xenon flash lamp 212 below. As the bolt slides down the track (generally oriented threaded end first thanks to feeder tooling) the bolt end trips a light emitting diode and detector part present sensor 220 which fires the flash. The light from the flash travels through the Teflon track thereby freezing the bolt image or a portion thereof on the array by virtue of objective lens 221.

The scan axis of the array lines is typically oriented across the bolt diameter i.e. perpendicular to the longitudinal axis of the bolt. Thus the real time resolution improvement resulting from the electronic techniques of the disclosed invention increases the diametral measuring accuracy.

A microcomputer controller 240 is utilized to compare multiple diametral sections to stored acceptable values for the bolt plus compute the overall length, threaded length, head height, washer thickness (if any) and captive washer presence (if any) from sequential line scan data. Optically the number of threads can also be counted as well.

After the comparison, the part is accepted or rejected by blow-off air solinoid 250 as shown.

A detector 260 can be located in the image plane adjacent to the matrix array to turn off the flash when a normal energy level has been reached, thereby compensating for dirty windows or track.

The Xenon flash source can optionally be replaced by a bank of pulsed solid state sources such as diode lasers or LEDs, 270, as shown. The circuitry here described, unlike fixed threshold types can be used with uneven light fields as result from such use of discrete sources.

Machines built in this manner will make significant productivity improvements by providing prequalified parts to assembly machines. Indeed the sensing units here disclosed can be mounted right in the feed tracks of said machines.

Diametral accuracies of 0.002" using an inexpensive TN 2200 array system are possible on 2" bolts. Note that a special part present detector 275 is required upstream to dump charge from the array before the flash. This extra detector is necessary to provide repeatable triggering for rapidly moving parts.

The photo detector array must be continuously scanned to keep the array cleared of charge due to stray light and leakage current (on the detector array itself). The scan rate of the TN 2200 camera is 20 scans per second. Since the parts are travelling at a high speed, the array can miss the part completely if it waits until the end of the next scan to fire the flash. Firing the flash during the scan is undesirable because the format of the video signal makes the processing of it difficult.

Using a second part present detector (275) solves the problem because it gives the array advance notice that a part is approaching. Given this information, the array can finish its current scan and stop scanning at the end of scan. When the part reaches detector 220, the flash can be fired and the data read instantly. The time that the scanning is stopped is not sufficient to allow significant build up of stray light or leakage current.

A special display with freeze memory is also provided with cursors to set up diametral and longitudinal comparisons.

For inspection of bolt head dimensions and washer integrity plus large head cracks and the like, a second solid state matrix array camera 280 can be used, positioned at a slant angle to the track to view the head area end on. For general washer and head inspection the back lighting provided by the same flash coming through the track suffices. Optionally additional light sources can be provided such as 285 reflecting off the bolt head.

A base 290 is usually provided for the above components, as are protective housings such as 291 and 292 with windows 293 and 294.

Note that on long parts the lens magnification can be set up such that only the head end is viewed since the flash occurs at a precise point of triggering if a precision part position sensor such as 294 comprised by lens and detector with slit aperture is used. This freezes the head end allowing one to read overall length, threaded length and generally all other meaningful variables as well.

The Vee track is inexpensive, constrains well the cylindrical parts, and is particularly useful for bolts where the head is of significantly different diameter. Similarly a translucent Vee section belt with motor drive can also be used, which allows higher part rate due to speed consistency.

Finally a motorized flat belt of mylar or other transparent or translucent material can also be used to transport the part with the part constrained by guide rails. Indeed an opaque belt can be used if the light source and camera is horizontal.

Next disclosed is an extremely useful additional application of the circuit technology disclosed to 2 dimensional inspection using a matrix array, a sequential line scan of a moving image (either due to motion of the part or a sweep of its image past the linear array in question), or for processing of sequential scans of a circular array like a Reticon 720 but having multiple rings or multiple elements (such arrays are not yet commercially available).

In brief, the technique for two axis mensuration and a matrix array is to read the lines of elements, line by line and determine the edge locations using, for example, the circuit here described. This defines the edges in the direction of the scan lines. The second dimension is obtained by reading the information column by column, which is at right angles to the lines of the array, and process the information by the disclosed electronics.

The technique here is to additionally read each element of each scan into a gray level digital memory (e.g. 256 levels, or 8 bits) and then read out each equivalent array column of the memory into the same circuit disclosed (e.g. that of FIG. 2 or 5). In this manner the point of edge location in 2 planes is determined, which is of value is generalized measurement of 2 dimensional images of objects. This technique also works on 2 axis diffraction patterns such as those produced by square apertures.

Video data from the photo detector array (A) is passed through the video switching network (K) to send data to spatial resolution enchancement system (L). The spatial resolution enhancement system locates the image edges for each array line and the location of these edges are stored in data storage element (M).

At the same time, the video data is converted to digital form by the analog to digital convertor (H). The video signal from each array element is converted to a number that is proportional to the light falling on it. This series of numbers (one for each array element) is stored in the digital buffer storage (I). The data is stored in the order of the array lines (i.e. line 1 element 1, line 1 element 2 . . . line 2 element 1, line 2 element 2, etc.).

After the edges for the lines have been stored (as mentioned previously) the video switching network (K) is set to receive the signal from the digital to analog convertor (J). The image data is recalled from the digital buffer storage (I) one element at a time and converted back to analog form. However, when the data is read back, it is read in the order of the array columns (i.e. line 1 element 1, line 2 element 1 . . . line 1 element 2, line 2 element 2 etc.)

Now the spatial resolution enhancement system (L) locates the image edges for each array column and the location of these edges are stored in the data storage element (M). By using this technique, the same resolution enchancement system can be used for both the vertical (columns) and horizontal (lines) directions of the image array.

By changing the order that the elements of the image data are read from the digital buffer storage (I), the location of the edges on diagonal lines may also be accurately found and stored. Again the processing elements L and M are used to locate and store edges for all directions that may be scanned by storage unit I.

Finally it is noted that the above disclosed invention, particularly in its 2 axis form is of considerable value in determining the position of objects in space. Particularly considering the use of either shadow reflected object images as in FIG. 10 or 9 respectively, one can immediately derive beneficial results in "vision" systems used for robot control. The accurate deliniation via the invention under all conditions of holes, edge outlines and other features of parts is essential for proper operation in the industrial environment.

Figure 12:
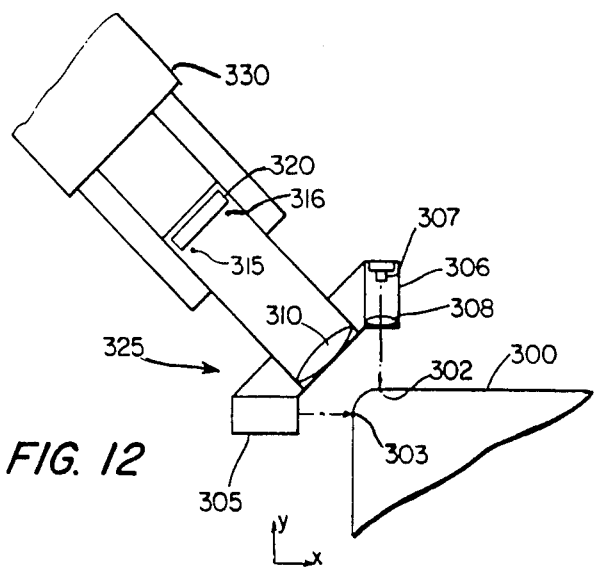
FIG. 12 illustrates an article position determining apparatus.

FIG. 12 illustrates an embodiment of the invention used for determining the position of automotive sheet metal panel edges in space, when attached to a robot. The sensor utilized operates on the optical triangulation principle similar to that in a copending application. This embodiment however has 2 orthogonal axes of measurement and incorporates the desirable circuit aspects such as described heretofore.

As shown, the position in x and y of sheet metal panel 30 is simultaneously determined by projecting spots 303 and 304 onto its surface by beam projectors 305 and 306, typically comprising diode laser 307 and focusing lens 308.

Said spots are imaged by lens 310 to form spot images 315 and 316 on linear photo detector array 320.

In operation, the 2 axis sensor ensemble 325 is moved near the door edge by robot arm 330 (typically an ASEA or Cinncinatti Robot) and sheet panel position obtained through reference lock to the robot co-ordinate axes.

This is an independent dual channel system and can be operated in one axis with either 305 and 306 extinguished. To separate the reading in x and y therefore one need merely pulse the source 306 and determine the position of the y axis spot on the diode array, then shortly thereafter pulse the x spot from 305 and do likewise. The spot image on the array is proportional to location.

To determine the spot image location on the array, a circuit such as that FIG. 5 is utilized to find the first derivative of peak location of the spot. Alternatively, a circuit like FIG. 2 can be used to find the inflection points on one or both sides of the spot and the centroid computered the microcomputer or hardware circuitry.

This circuit approach particularly using high speed timer with a clock rate in excess of the array rate is very advantageous for increasing the resolution of such triangulation systems which typically are not very sensitive as only low power magnification of the lens system can be used.

The above 2 axis proximity sensing system, besides being useful for measuring sheet metal contours and edge locations, can also be used to advantageously provide feedback signals to robot control systems as a function of part location in 2 orthogonal range axes. Combination of this with the previous embodiment providing 2 axis mensuration of images in the plane perpendicular to the lens axis, provides a complete 3-4 axis measurement and control capability.

All of the foregoing embodiments are representative of the scope of the invention and many other variations are possible.

As mentioned above the invention can also be utilized for measurement of edge locations of bars in bar codes, using in general reflected light off the code printed or etched on the surface of a part or a tag put thereon.

In the bar code case, the invention gives a very desirable freedom from returned light power variation, all across the field of view of the diode array, an important point since on long bar codes, such as code 39, it is very difficult to have uniform lighting on all bars using inexpensive source (such as tail light bulbs) and is further made difficult by the often high angular zone of acceptance by the lens system.

Similar in some respects to the reading of bar codes is another use of the invention. In this case, however, bar or grid locations are read by imaging through a surface to determine the quality of the surface.

Figure 13A:
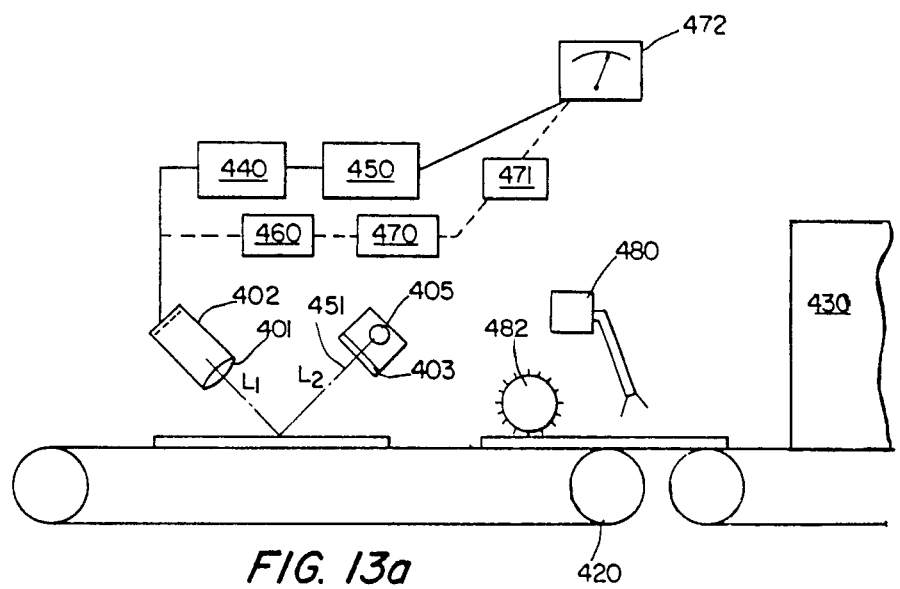
FIGS. 13a, 13b and 13c illustrate the imaging of a uniform grid.
Figure 13B:
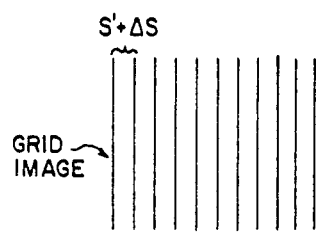
Figure 13C:
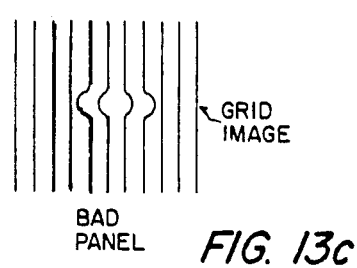

For example, consider FIG. 13 which illustrates the imaging of a uniform grid of long vertical bars 400 of spacing R (out of plane of paper) by lens 401 onto linear diode array 402. Linear back illumination source 405 provides diffuse light.

In this case however, the light path includes the part surface 410 as a mirror, whose properties are of interest either for discrete defects such as dings and dents, or surface finish such as microfinish or paint quality. Object distance of lens 401 is $L_1+L_2$. In this latter case the contrast of the bars gives the desired answer, and generally an alternative analog circuit for D-A conversion and amplitude analysis of the grid image provides the answer.

Consider now the case of dings and dents on sheet metal body panels such as the car door shown, moving on conveyor 420 out of the last stage of an automatic transfer press line.

Here the problem is to find localized defects on the panel such as dings and dents caused primarily by dirt in the press die. There are typically 002"-015" deep or raised approximately 050"-100" in diameter. This type of flaw is different than those on the cam lobe in FIG. 9 since there is no obvious contrast difference unlike a black porosity pit on a shiny cam lobe for example. However there is an appreciable localized slope change on the part surface and this technique finds it.

The diode array scans very fast (typically 1000/sec.) and looks for localized distortions in the grid pattern due to dings or dents (see inset). Alternatively, a less desirable but workable way is to look for localized contrast drops.

Once identified their local contant points and their magnitude (i.e. degree of distortion) can be read into a storage memory and used to present a defect map of the surface. Alternatively the presence of a defect can be used to trip an ink marker to mark it and/or a red light to reject the panel.

The above disclosed circuit 440 serves to help identify the edge locations of the bars, from which sequential subtractions to determine local spacing changes can easily be made in hardware or the microcomputer 450 to determine localized defects.

In a more sophisticated generally off-line processing mode, the microcomputer can compare the variation in image spacing (such as $S^1$ to $S^1+S$) over the whole panel (rather than locally) and thence get overall panel contour. This works well on quasi flat surfaces. On more curved surfaces the direct projection triangulation technique such as FIG. 12 is useful, in this case projecting one or more lines whose edge locations are monitored rather than a spot as in FIG. 12 whose image center is determined. In this case light source 405 is a projection lamp and an auxilliary lens 451 (dotted lines) is used to image the grid onto the surface. In this case the object distance of lens 401 is $L_1$.

The use of such projected grids has a considerable use on feature analysis and pattern recognition of objects where it lends a shape function more or less independent of part reflectivity. In this application, the disclosed electronics are a definite advantage as it allows edge location to be determined over a wide range of light levels and out of focus conditions (due to excessive object depth for the lens system used). This is arrangement does not however have the amplication provided by the lever arm effect of the mirror formed by the surface (which of course can only be used when the surface is suitably reflective at the wavelength of light used).

Note that in the embodiment shown, the raw metal surface of the panel is seldom reflective enough by itself and further has random distribution of drawing compound, die oil, and water on its surface which cause distortion of the grid or even destruction of the image. Accordingly, a part brushing and oil station is provided with an optional air blow as well.

As panels come from the press, they are first sprayed with a light oil mist by sprayer 480, typically the same oil used in the die, which mixes with the wash water. Then they are brushed with a higher quality non shed brush, 482 oriented at an oblique angle such that combined with the conveyor speed, the brush marks are transverse to the direction of motion, i.e. in the direction of array scan which makes undulation of the oil film in this direction not picked up as desired.

This surface preparation works surprisingly well. Additionally an air blow can be provided to smooth the oil film after the brush, but this is generally not necessary.

An alternative analysis circuit of use for the above embodiment is to employ a phase lock loop. In this case, the diode array grid image output is filtered by a low pass filter 460. A phase lock loop integrated circuit 470 such as an NC 565, "locks on" to the grid image frequency $(1/S^1)$ and a band pass filter 471 provides an output signal on a meter or similar device 472 whose magnitude is roughly proportional to the magnitude of the defect.

Use of the phase lock circuit requires a prescan of grid bars to establish the lock in, thus one must scan somewhat more than the surface area under investigation.

In a practical example of this embodiment of the invention, a Reticon 1728 element linear array, with a grating 12" long having equal spaced or 2" high and spaced ⅛" wide. Part travel rate was 12"/sec. and a scan rate of 1000/sec. was used. Due to the amplification provided by the lever arm effect of the surface "mirror", this rate easily allowed more than one scan through every flaw of interest.

It is further noted that a matrix array or other two dimensional scan means may be utilized to look at successive bar positions in the vertical direction thereby not requiring the part to be moved in order to look at successive sections of its surface (although this is advantageously provided "for free" in the conveyor shown). In addition the grid may be viewed from a direction transferse to that shown, i.e. with the lens axis transverse to the part motion direction. In this case, however, a two dimensional array scan is required to scan across the surface.

It should be noted that this panel inspection technique also works with Vidicon cameras, though less desirably. Errors in said Vidicon across its field do not enter as only local deviations are looked for. Also the angle of incidence to the part surface is typically 5°-25°.

For phase locked loop operation the filter 460 is typically run at close to the clock frequency just to remove same.

In the above embodiments taking first or second derivative data to describe various light pattern points has been described. It is also of interest to take both first and second derivatives to further define light pattern positions. This need for more data is particularly true in certain projected triangulation grid data as discussed relative to FIGS. 9 and 13, where the utmost resolution is desired and part reflective characteristics make some data not reliable.

Another point of interest in looking at contour data such as the varience of the grid image spacing $S^1$ to $S^1+S^1$ in FIG. 13 (inset) is that a constant frequency filter as is desirable in other embodiments (e.g. FIG. 2B) is not desirable here as the array output frequency is changing due to the grid image spacing thus a variable frequency filter may here be desirable, to smooth the discrete array elements without consideration of the signal frequency—particularly if the number of resolution elements of the array per grid image line is relatively few.

Relative to FIGS. 2 and 5, for normal use, on object images and diffraction patterns, it is desirable to use a Bessel filter of at least 3 poles, with for example, 100 KHz cut off of the low pass filter for a one MHz array clock rate. Use of this filter not only filters the array clock noise but also provides a desirable degree of averaging over array elements to eliminate inter-element sensitivity differences.

For spot triangulation, a 6 pole or greater filter is generally desirable, operating for example at 10 KHz for a 1 MHz clock rate. This provides the essential smoothing to eliminate the effect of speckle in laser spot images.

What is claimed is:

1. A method for inspecting the surface of objects such as panels for automotive vehicles or the like, said method comprising:
   spraying a surface of the object with an oil mist to increase the reflectivity of the surface of the object and to thereby enable the detection of light reflected therefrom by an optical-electrical detector;
   illuminating the object with light to produce a light image for detection by a said optical-electrial detector;
   detecting the light image using a said optical-electrical detector; and
   analyzing the output of said optical-electrical detector so as to determine surface features of the object.

2. A method for inspecting objects as claimed in claim 1 wherein said object is made from a die containing oil and the oil used in the oil mist sprayed thereon is of the same type as the oil contained in the die.

3. A method for inspecting objects as claimed in claim 1 wherein said object with the oil mist sprayed thereon is also brushed with a brush to provide smoothing of the oil prior to said detecting step.

4. A method for inspecting objects as claimed in claim 3 wherein said optical-electrical detector comprises a scanned photodetector array which scans in a predetermined direction and wherein brush marks are produced by said brush during brushing of the oil, said brush marks being oriented relative to the direction of scan of the array so as to substantially eliminate the effect of undulations produced in the oil during brushing.

5. A method for inspecting objects as claimed in claim 4 wherein said a plurality of objects are moved on a conveyor and the brush marks produced during brushing are oriented transversely to the direction of movement of the conveyor.

6. A method for inspecting objects as claimed in claim 3 wherein an air stream is directed over said object to provide smoothing of said oil mist prior to said detecting step.

7. A method for inspecting objects claimed in claim 1 wherein an air stream is directed over said object to providing smoothing of said oil mist prior to said detecting step.

8. A method for inspecting objects as claimed in claim 1 wherein said image comprises a grid pattern comprising a plurality of spaced line projected onto said object and the grid pattern on the object is detected by said optical-electrical detector.

9. A method for inspecting objects as claimed in claim 8 wherein variations in the spacing between the lines of the grid pattern over the entire surface of the object are detected.

10. A method for inspecting objects as claimed in claim 8 wherein said grid pattern is repeated sequentially for a plurality of separate locations on the surface of the said objects and localized distortions of a said grid pattern are detected.

11. An apparatus for inspecting the surface of an object such as a panel for an automotive vehicle or the like, said apparatus comprising:
    an optical-electrical detector means for producing an output in accordance with the light received thereby;
    means for spraying a surface of an object with an oil mist to increase the reflectivity of the surface of the object to thereby enable the detection of light reflected therefrom by said optical-electrical detector means;
    means for illuminating the object with the oil mist sprayed thereon with light to produce a light image which is received by said optical-electrical detector means; and
    means for analyzing the output produced by said optical-electrical detector means in response to receiving said light image to determine surface features of the surface of the object.

12. An apparatus as claimed in claim 11 wherein said object made from a die containing oil and wherein said spraying means sprays the same type of oil on said object as contained in said die.

13. An apparatus as claimed in claim 11 further comprising brushing means for brushing said object after the oil mist has been sprayed thereon by said spraying means so as to provide smoothing of the oil.

14. An apparatus as claimed in claim 13 wherein said optical-electrical detector means comprises a scanned photodetector array which scans in a predetermined direction and said brushing means produces brush marks which are oriented relative to the direction of the scan of the photodetector array so as to substantially eliminate the effect of undulations in the oil produced by said brushing means.

15. An apparatus as claimed in claim 14 further comprising conveyor means for moving said objects in a predetermined direction along a path of travel, said brushing means being oriented relative to said conveyor means such that the brush marks produced thereby are transverse to the direction of movement of the objects provided by the conveyor means.

16. An apparatus as claimed in claim 15 further comprising means, disposed at a location along said path upstream of said detector means, for directing an air stream over said object to provide smoothing of the oil sprayed thereon by said spraying means.

17. An apparatus as claimed in claim 11 further comprising means for directing an air stream over the surface of said object to provide smoothing of the oil sprayed thereon by said spraying means.

18. An apparatus as claimed in claim 11 wherein said illuminating means comprising means for projecting a grid pattern comprising a plurality of spaced lines onto said object for detection by said optical-electrical detector means.

19. An apparatus as claimed in claim 18 wherein said detector means detects variations in the spacing between the lines of the grid pattern over the entire surface of the object.

20. An apparatus as claimed in claim 18 wherein said grid pattern is sequentially repeated for a plurality of locations on the surface of said object and said detector means detects localized distortions of a said grid pattern.

21. A method for inspecting the surface of an object such as a panel for an automotive vehicle or the like, said method comprising:
applying a fluid to the surface of the object to render the surface sufficiently reflective to enable the detection of light reflected therefrom by an optical-electrical detector;
illuminating the surface of the object with light so that a light image reflected therefrom is detected by a said optical-electrical detector; and
analyzing the output produced by said optical-electrical detector in response to the detection of said light image thereby so as to determine surface features of the object.

22. A method as claimed in claim 21 wherein the fluid applied to the surface of the object is an oil mist and said oil mist is sprayed onto the surface.

23. A method as claimed in claim 21 wherein the surface of the object is illuminated with a light grid pattern of spaced lines.

24. A method as claimed in claim 21 wherein the surface to which the fluid is applied is brushed to provide smoothing of the fluid, said brushing being carried out in a predetermined direction so as to reduce the effect of brush marks left by the brushing on the light image detected by the optical-electrical detector.

25. An apparatus for inspecting the surface of an object such as a panel for an automotive vehicle or the like, said apparatus comprising:
an optical-electrical detector means;
means for applying a fluid to the surface of the object to render the surface sufficiently reflective to enable detection of light reflected therefrom by said electrical-optical detector means;
means for illuminating the surface of the object with light so that a light image reflected therefrom is detected by said optical-electrical detector means whereby said optical-electrical detector means produces an output in accordance therewith; and
means for analyzing the output produced by said optical-electrical detector means in response to the detection of said light image thereby so as to determine surface features of the surface of the object.

26. An apparatus as claimed in claim 25 wherein said fluid applying means comprises means for spraying the surface of the object with an oil mist.

27. An apparatus as claimed in claim 25 wherein said illuminating means comprises means for projecting a light grid pattern of spaced lines onto the surface of the object.

28. An apparatus as claimed in claim 25 further comprising brushing means for, in order to provide smoothing of the fluid applied to the surface of the object, brushing the fluid applied to the surface in a predetermined direction to reduce the effect produced by brush marks left by the brushing means on the light image detected by the optical-electrical detector means.

* * * * *